United States Patent
Castricum (12) 
(10) Patent No.: US 6,295,853 B1
(45) Date of Patent: Oct. 2, 2001

(54) SPIRALLY FORMED PIPE CUTTER WITH DRIVING MECHANISM TO ACTIVELY ROTATE INNER KNIFE

(75) Inventor: Wilhelmus P. H. Castricum, Ormond Beach, FL (US)

(73) Assignee: Lindab AB, Bastad (SE)

( * ) Notice: Subject to any disclaimer, the term of this patent is extended or adjusted under 35 U.S.C. 154(b) by 0 days.

(21) Appl. No.: 09/506,756

(22) Filed: Feb. 18, 2000

(51) Int. Cl.$^7$ ................................................ B21C 37/12
(52) U.S. Cl. ................................................ 72/49; 72/132
(58) Field of Search ........................................ 72/49, 132

(56) References Cited

U.S. PATENT DOCUMENTS

| | | |
|---|---|---|
| 549,707 | 11/1895 | Denney . |
| 684,539 | 10/1901 | Cartwright . |
| 694,524 | 3/1902 | Boyd . |
| 957,966 | 5/1910 | Jenkins . |
| 1,345,458 | 7/1920 | Pierce . |
| 1,372,040 | 3/1921 | Rendano . |
| 1,478,692 | 12/1923 | Baranoff . |
| 1,635,807 | 7/1927 | Amberg . |

(List continued on next page.)

FOREIGN PATENT DOCUMENTS

| | | |
|---|---|---|
| 27 24 859 A1 | 12/1978 | (DE) . |
| 0 353 622 A1 | 2/1990 | (EP) . |
| 0 384 625 A1 | 8/1990 | (EP) . |
| 0 499 915 A1 | 8/1992 | (EP) . |
| 0 583 461 | 2/1994 | (EP) . |
| 0 714 713 A1 | 6/1996 | (EP) . |
| 0 749 787 A1 | 12/1996 | (EP) . |
| 2 218 963 | 9/1974 | (FR) . |
| 718424 | 11/1954 | (GB) . |
| 749389 | 5/1956 | (GB) . |
| 784289 | 10/1957 | (GB) . |
| 53-80881 | 7/1978 | (JP) . |
| 08300216 | 11/1996 | (JP) . |
| 8-300216 | 11/1996 | (JP) . |
| WO 98/17412 | 4/1998 | (WO) . |

OTHER PUBLICATIONS

Excerpt from Grainger Catalog: Electric Shears p. 1481, believed to be published prior to Dec. 5, 1997.

International search report for PCT/SE 98/00690 mailed Jul. 9, 1998.

International search report for EP 95 30 8157 completed Mar. 5, 1996.

Co-pending U.S. patent application Serial No. 09/434,899, filed Nov. 5, 1999.

Primary Examiner—Lowell A. Larson
(74) Attorney, Agent, or Firm—Brinks Hofer Gilson & Lione (57) ABSTRACT

A method and apparatus for cutting spiral pipe is disclosed. The pipe cutting apparatus includes a driving mechanism that imparts rotation to a knife located inside the spiral pipe via a drive element, such as a drive shaft. The method includes forming a spiral pipe from a strip of material received at a forming head of a spiral pipe former, engaging a driving mechanism attached to a first knife positioned substantially inside the inner circumference of the pipe forming head to impart rotation to the first knife, and cutting the spiral pipe with the first knife by bringing a second knife positioned substantially outside the outer circumference of the forming head into overlapping contact with the first knife.

23 Claims, 5 Drawing Sheets

U.S. PATENT DOCUMENTS

| | | |
|---|---|---|
| 1,740,430 | 12/1929 | Mudd . |
| 2,516,817 | 7/1950 | Wernli . |
| 2,595,747 | 5/1952 | Andersen . |
| 2,734,472 | 2/1956 | Bornand . |
| 2,749,983 | 6/1956 | Rogers . |
| 3,029,674 | 4/1962 | Southwell et al. . |
| 3,122,115 | 2/1964 | Siegwart . |
| 3,268,137 | 8/1966 | Martin . |
| 3,472,131 | 10/1969 | Perusse et al. . |
| 3,472,132 | 10/1969 | Perusse et al. . |
| 3,515,038 | 6/1970 | Perusse et al. . |
| 3,540,333 | 11/1970 | Johnson . |
| 3,564,888 | 2/1971 | Miller . |
| 3,606,783 | 9/1971 | Lewis . |
| 3,621,884 | 11/1971 | Trihey . |
| 3,753,363 | 8/1973 | Trihey . |
| 3,831,470 | 8/1974 | Maroschak . |
| 3,839,931 | 10/1974 | Herpich . |
| 3,839,933 | 10/1974 | Paramonoff . |
| 3,863,480 | 2/1975 | Meserole . |
| 3,866,501 | 2/1975 | Glendenning et al. . |
| 3,913,430 | 10/1975 | van Dijk . |
| 3,940,962 | 3/1976 | Davis . |
| 4,058,997 | 11/1977 | Siegwart . |
| 4,126,064 | 11/1978 | Tarrant . |
| 4,292,867 | 10/1981 | Stoffels et al. . |
| 4,353,232 | 10/1982 | Viesturs et al. . |
| 4,583,389 | 4/1986 | Thomas . |
| 4,612,789 | 9/1986 | Andriessen . |
| 4,622,838 | 11/1986 | Schafer . |
| 4,706,481 | 11/1987 | Castricum . |
| 4,711,110 | 12/1987 | Castricum . |
| 4,751,839 | 6/1988 | Thomas . |
| 4,823,579 | 4/1989 | Castricum . |
| 4,924,684 | 5/1990 | Castricum . |
| 4,934,225 | 6/1990 | Languillat et al. . |
| 4,987,808 | 1/1991 | Sicka et al. . |
| 5,020,351 | 6/1991 | Castricum . |
| 5,063,798 | 11/1991 | Kitaoka et al. . |
| 5,074,018 | 12/1991 | Binggeli et al. . |
| 5,086,677 | 2/1992 | Languillat . |
| 5,105,639 | 4/1992 | Castricum . |
| 5,105,700 | 4/1992 | Kusakabe . |
| 5,193,374 | 3/1993 | Castricum . |
| 5,243,889 | 9/1993 | Wallis . |
| 5,257,521 | 11/1993 | Castricum . |
| 5,335,570 | 8/1994 | Ro . |
| 5,421,185 | 6/1995 | Castricum . |
| 5,477,717 | 12/1995 | Skrebergene et al. . |
| 5,592,741 | 1/1997 | Vassar . |
| 5,609,055 | 3/1997 | Castricum . |
| 5,636,541 | 6/1997 | Castricum . |
| 5,860,305 | 1/1999 | Castricum . |
| 5,992,275 | 11/1999 | Castricum . |

SPIRALLY FORMED PIPE CUTTER WITH DRIVING MECHANISM TO ACTIVELY ROTATE INNER KNIFE

FIELD OF THE INVENTION

The present invention relates to pipe cutters and formers and for cutting spirally formed pipes. More particularly, the present invention relates to a pipe cutter or slitter having the ability to cut spirally formed pipe utilizing a knife driving mechanism.

BACKGROUND

Spirally formed pipe or tube is typically formed from a single strip of metal. As a pipe is formed, the strip of metal is coiled and adjacent edges of the strips are folded and pressed together to form a lockseam. When the spirally formed pipe reaches a desired length, a pipe cutting device severs the pipe. Spiral pipe has applications in many areas, including vehicle oil filters, culvert pipe and HVAC (heating, ventilation and air-conditioning).

Conventional pipe cutters often utilize saw blades or cutting knives. Saw blades may present safety issues as well as problems with forming clean cuts on the pipe. Pipe cutting knives may be advantageous depending on the nature of the pipe that is formed.

When spiral pipe is formed, a strip of material is coiled in the pipe former so that the adjacent edges of the coiled strip overlap. In some pipe formers, a pair of clinching rollers are used together to fold the adjacent edges of the coiled strip onto each other and to compress the folded edges into a helical lockseam. This lockseam may consist of four layers of material, for example.

A design challenge for pipe cutters lies in preventing problems with the formation of the pipe. Typically, the cutting blades or knives in a conventional pipe cutter will be configured in a fixed arrangement or in one that is free to rotate, that is, passively rotate. Material may encounter resistance when presented to such fixed or passive cutting arrangements. The helical lockseam in particular may create difficulties for fixed or passively rotatable knives. In the case of a thin gauge or a light material, the material can buckle when it encounters the fixed or passively rotatable knife. A thick gauge or a heavy material, will in general create a thicker lockseam. The lockseam might cause the machine to stall when it encounters the knife. It would be desirable to implement an arrangement that assists the cut to decrease the likelihood of common pipe formation mishaps such as buckling of light material and as stalling of the machine during the processing of heavy material.

DETAILED DESCRIPTION OF PRESENTLY PREFERRED EMBODIMENTS

In order to address the need for a pipe cutter or slitter capable of improved operation and having an active driving mechanism to rotate an inner knife, several embodiments for cutting and forming spiral pipe are described below.

Figure 1:
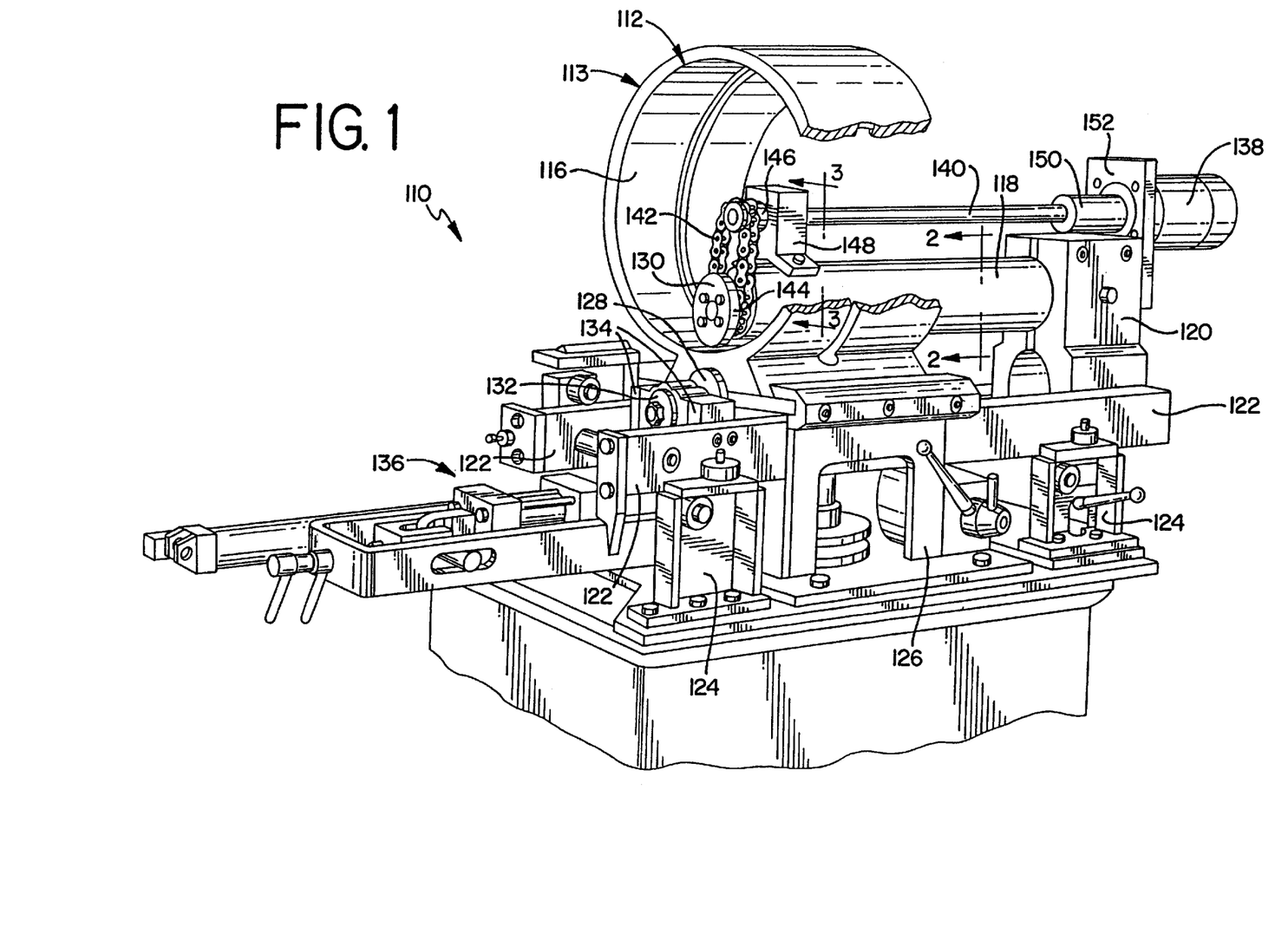
FIG. 1 is a perspective sectional view of a pipe cutting and forming apparatus according to a first presently preferred embodiment.

Referring to FIG. 1, shown is an apparatus 110, according to a first presently preferred embodiment, for cutting and forming spiral pipe or tube. The apparatus 110 may be constructed using an existing spiral pipe former and cutter, such as those available from Spiral-Helix, Inc. of Buffalo Grove, Ill., modified to include an active driving mechanism to rotate an inner knife as described herein. For a more detailed discussion of suitable pipe formers and cutters, reference is made to U.S. Pat. Nos. 4,706,481, 4,924,684 and 5,636,541, and pending application Ser. No. 09/434,899, filed on Nov. 5, 1999, now U.S. Pat. No. 6,192,726, the entire disclosures of which are incorporated herein by reference.

The apparatus 110 includes a fixed forming head 116 that receives a thin strip of material, preferably sheet metal, and curls the strip of material around the interior of the forming head 116. The forming head 116 has an inner circumference 112 and an outer circumference 113. A cylindrical mandrel 118 is held by a mandrel holder 120 connected to one end of the mandrel 118. The mandrel holder 120 and the attached mandrel 118 connect to a pair of runners 122 between a pair of support legs 124 having rollers guiding each of the runners 122. The mandrel holder 120 is rigidly attached to, and moves with, the runners 122. The runners 122 are slidably mounted in the rollers on each of the support legs 124. The runners 122 pass underneath the forming head 116 and through the forming head table 126.

Figure 2:
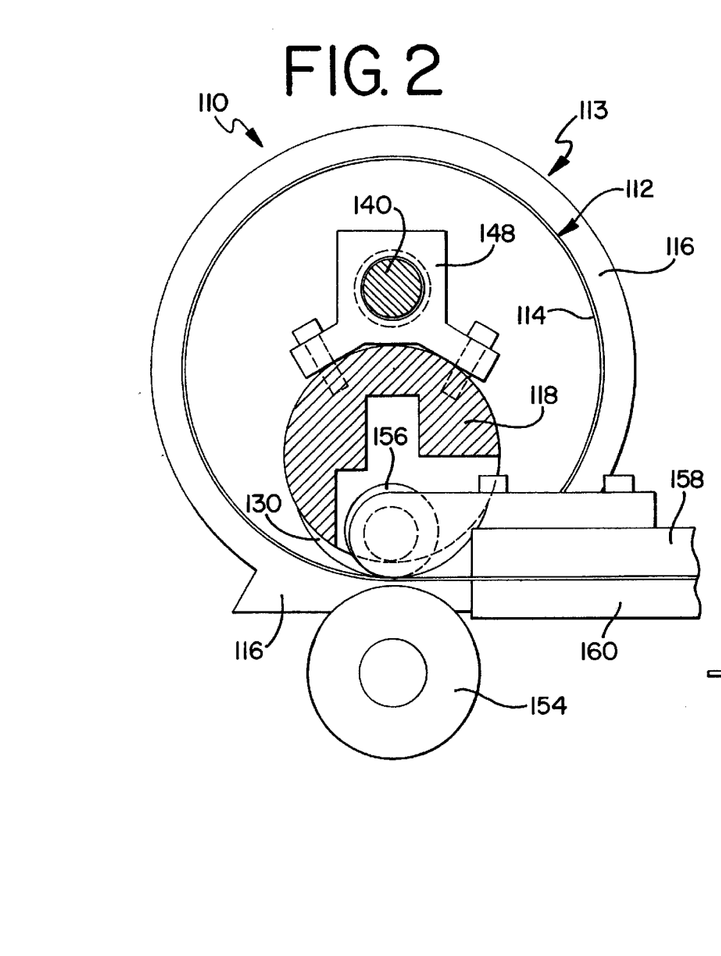
FIG. 2 is a cross-sectional view taken along line 2—2 of FIG. 1.

As shown in FIG. 1, the pipe cutting section of the apparatus 110 includes an outer knife 128 that is generally positioned outside the pipe 114 (see FIG. 2). The outer knife 128 is positioned outside the pipe such that radial movement of the outer knife 128 towards an inner knife 130 will cause the knives 128, 130 to overlap and puncture the pipe during a cutting operation. The outer and inner knives 128, 130 are used to smoothly and squarely cut lengths of pipe. Preferably, the outside circumferential surface of the inner knife 130 is knurled or ridged to provide traction to the pipe material that is presented to the inner knife 130 so that the pipe material can be received by the inner knife 130. A lock washer and lock nut connected to a shaft extending through the outer knife 128 hold the outer knife 128 in a knife holder 132. The shaft is preferably mounted in a bearing assembly that permits passive rotation of the outer knife 128. Contact of the outer knife 128 with the rotating pipe rotationally drives the outer knife 128. In an alternative embodiment, the outer knife 128 may be actively rotated by any of a number of commonly available motors. In the event that the outer knife 128 is actively rotated, the outside circumferential surface of the outer knife 128 will be knurled to grip the pipe material.

The knife holder 132 is movably mounted in a knife slide block 134 by a slide bearing assembly (not shown in FIG. 1). The slide bearing assembly provides for low friction movement of the knife holder 132 in a radial direction of the pipe. A suitable slide bearing assembly may be constructed using THK Needle Strips No. FF2025CW. The slide bearing assembly attaches to the central portion of a knife slide block 134 that is connected to the runners 122. Thus, the knife holder 132 may move in a radial direction relative to the pipe, and the knife holder 132 and bearing assembly may move axially with respect to the pipe on the runners 122.

A cylinder assembly 136, which may be hydraulic or pneumatic, preferably moves the outer knife 128 into and away from the pipe. The cylinder assembly 136 includes a cylinder that controls a piston. When the piston is fully extended, the knife holder 132 is raised into a cutting position where the inner and outer knives 130, 128 overlap and puncture the pipe. The other side of the cylinder assembly 136 also connects to the knife slide block 134 so that the entire assembly can move axially with the runners 122.

In FIG. 1, a driving mechanism that includes a motor 138, a drive shaft 140, and a roller or drive chain 142, is utilized to impart rotation to the inner knife 130 during the cutting operation. A hydraulic motor is illustrated in FIG. 1 for the motor 138. However, the motor 138 can also be a pneumatic motor. Other actuating devices, such as stepper motors, may also be used. In another aspect of the embodiment, an electric gear motor is utilized as the motor 138 to actively drive the inner knife 130. The motor 138 is fixably connected to the mandrel holder 120 by way of a motor mounting plate or adapter 152 that is mounted on the mandrel holder 120. The drive shaft 140 spans the axial distance between the motor 138 and the inner knife 130. The drive shaft 140 is coupled to the motor 138 and the motor adapter 152 via a coupler 150, and turns as actuated by the motor 138. A bearing housing 148 is attached to the mandrel 118 at the top of the mandrel 118 at the side of the mandrel 118 nearest to the inner knife 130. The drive shaft 140 extends from the coupler 150 and the motor 138 and proceeds parallel with the mandrel 140. The drive shaft 140 passes through the bearing housing 148 and ends at a drive sprocket 146. The drive sprocket 146 is integrated or connected with the drive shaft 140 so that the sprocket 146 turns with the shaft 140. A drive chain 142 is looped around the drive sprocket 146 and a knife sprocket 144 that is connected to, or integrated with, the inner knife 130. Preferably, the drive chain 142 is looped tightly enough and the sprockets 144, 146 are sized such that the inner knife 130 rotates at approximately one-half of the pace of the drive shaft 140. Of course, it should be understood that the inner knife 130 can be set to rotate at any speed relative to the drive shaft 140 or to the motor 138.

Generally, the speed of rotation of the inner knife 130 or the surface speed of the inner knife 130 will be the same or a somewhat faster than the surface speed of the pipe 114 or pipe material. If the speed of the inner knife 130 is slower than the speed of the incoming pipe 114, then the inner knife 130 will obstruct the pipe 114 from moving, proving counterproductive to the purpose of actively driving the inner knife 130.

The inner knife 130 is generally positioned inside the pipe 114 (not shown in FIG. 1). The outer knife 128 is brought into overlapping contact with the inner knife 130 during a cutting operation. The inner knife 130 is mounted at one end of the mandrel 118 and is connected to, or integrated with the knife sprocket 144.

When the motor 138 turns the drive shaft 140, the drive sprocket 146 will turn as well. The drive chain 142 moves with the drive sprocket 146 and causes the knife sprocket 144 to rotate. In this way, the inner knife 130, which is connected to or integrated with the knife sprocket 144, is actively rotated by the driving mechanism of apparatus 110 of FIG. 1.

FIG. 2 shows a cross sectional view of the first presently preferred embodiment of the spiral pipe forming and cutting apparatus 110. As shown in FIG. 2, the apparatus 110 includes upper and lower guide plates 158, 160 to guide the strip of material that is used to form the spiral pipe 114 into the forming head 116. The apparatus 110 further includes a pair of inner and outer folding, lockseam, or clinching rollers 156, 154. The rollers 156, 154 cooperate to roll or clamp sides of the strip of material together, as the sides of the material forming the pipe 114 are adjacent to each other and overlap in the forming head 116, to form spiral pipe 114. The apparatus 110 further includes the mandrel 118, which is generally cylindrical in shape but deviates from this shape. As shown in FIG. 2 the mandrel 118 is partially hollow to accommodate the guiding, rolling and clamping operations in the forming head 116 as material is guided into the forming head 116 and spiral pipe 114 is formed. Also shown in FIG. 2 is the bearing housing 148, within which the drive shaft 140 is permitted to turn, mounted to the mandrel 118.

The operation of the first presently preferred embodiment of the spiral pipe forming and cutting apparatus 110, shown in FIGS. 1 and 2, is described below. The operation is similar in many respects to that described in detail in U.S. Pat. Nos. 4,706,481 and 5,636,541, and pending application Ser. No. 09/434,899, filed on Nov. 5, 1999. The entire disclosures of the patents and the pending application are incorporated by reference herein.

Referring to FIGS. 1 and 2, a strip of material, preferably metal, is prepared and pushed through the forming head 116 at the upper and lower guide plates 158, 160. The pipe former passes the strip of metal between the mandrel 118 and the forming head 116, and into the inner circumference 112 of the forming head 116, in a helical manner so that the adjacent edges of the coiled strip overlap. The inner and outer folding, lockseam, or clinching rollers 154, 156 cooperate to fold the adjacent edges of the coiled strip and compress the folded edges into a helical lockseam in a known manner. This lockseam may consist of four layers of material, for example. During the pipe forming process, the pipe 114 moves axially as it rotates.

After a desired overall pipe length is reached, a cutting operation is performed. Preferably, the driving mechanism that includes the motor 138, the drive shaft 140 and the drive chain 142, actively rotates the inner knife 130 to facilitate the cutting operation. The inner knife 130 is rotated in the direction of the pipe's rotation. The actively driven inner knife 130 system is designed to assist the pipe cutting apparatus 110 to avoid buckling of the material and stalling of the machine. The cylinder assembly 136 associated with the outer knife 128 activates to move the outer knife 128 into an overlapping position with the inner knife 130 to cut the pipe. As the apparatus 110 continues to produce pipe, the pipe moves axially with, and rotates between, the overlapping inner and outer knives 130, 128. The pipe is preferably completely severed after one revolution. A guide shaft piston assembly connected to the guide runners 122 and the support legs 124 assists with movement of the inner and outer knives 130, 128, the mandrel 118, and slides with the pipe 114 as a cut is made. In a preferred embodiment, the various cylinder assemblies are hydraulic or pneumatic cylinder assemblies. Other actuating devices, such as stepper motors, may also be used. Once the cutting process is complete, the cylinder or servo motor assemblies associated with the outer knife 128 and the guide runners 122 will return to their start position. Accordingly, the outer knife 128 moves away from the pipe, and the guide runner piston assembly pulls all the components fixedly connected to the guide runners 122 back to an initial position. The pipe cutter and former 110 may be configured to automatically cut and form pipe having a desired overall length.

Figure 3:
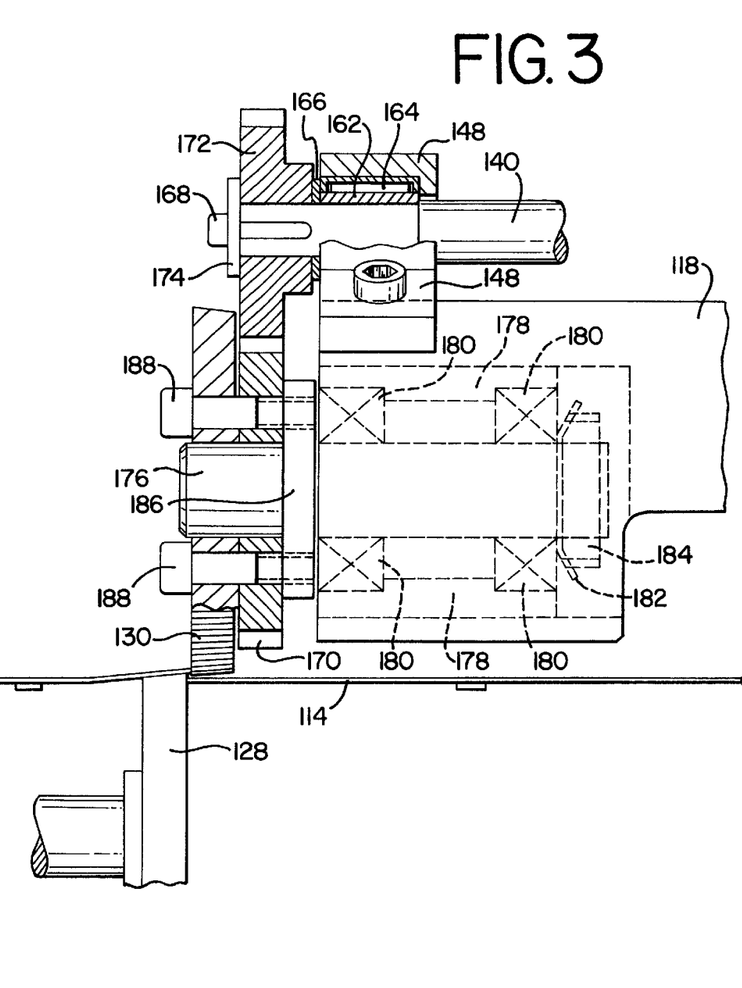
FIG. 3 is a cross-sectional side view taken along line 3—3 of FIG. 1 that illustrates a portion of an alternate active driving mechanism according to the first presently preferred embodiment.

FIG. 3 shows a cross sectional side view of a portion of an alternate active driving mechanism for the inner knife 130 of the spiral pipe forming and cutting apparatus 110. It will be understood by those skilled in the art that the drive chain 142 and the sprockets 144, 146 of FIG. 1 can be replaced with a pair of gears that mesh and turn together: a knife gear 170 and a drive gear 172. The drive gear 172 is mounted on and turns with the drive shaft 140. The knife gear 170 is mounted between the mandrel 118 and the inner knife 130 and connected to or integrated with the inner knife 130.

When the motor 138 turns the drive shaft 140, the drive gear 172 will turn as well. The knife gear 170 moves with the drive gear 172. In this way, the inner knife 130, which is connected to or integrated with the knife sprocket 144, is actively rotated by alternate driving mechanism of apparatus 110 shown partially in FIG. 3.

The drive shaft 140 rotates within a heat treated sleeve or inner ring 162, that runs in a needle bearing 164 mounted in the housing 148. The inner ring 162 and the needle bearing 164 are available from IKO International of Wood Dale, Ill. as part nos. IRT1720-1 and TA20202, respectively. A washer 166 located between the housing 148 and the gear 172 positions the gear 172 in proper alignment with the gear 170. The gear 172 is held in place by a bolt 168 and a washer 174.

The gear 176 is sandwiched between the inner knife 130 and a flange 186 along an inner knife shaft 176. The flange 186 is secured to the inner knife 130 and the gear 170 with four bolts 188 screwed into four threaded holes in the flange 186. The bolts 188 transmit the drive force from the gear 170 to the inner knife 130.

The inner knife shaft 176 is permitted to rotate in a housing 178 within the boom 118 via two pairs of taper bearings 180 adjusted by a lock nut 184 and held in place by a lock washer 182. Taper bearings 180 are available from FAG. Bearing Corporation of Stamford, Conn. as part no. 32005X.

Figure 4:
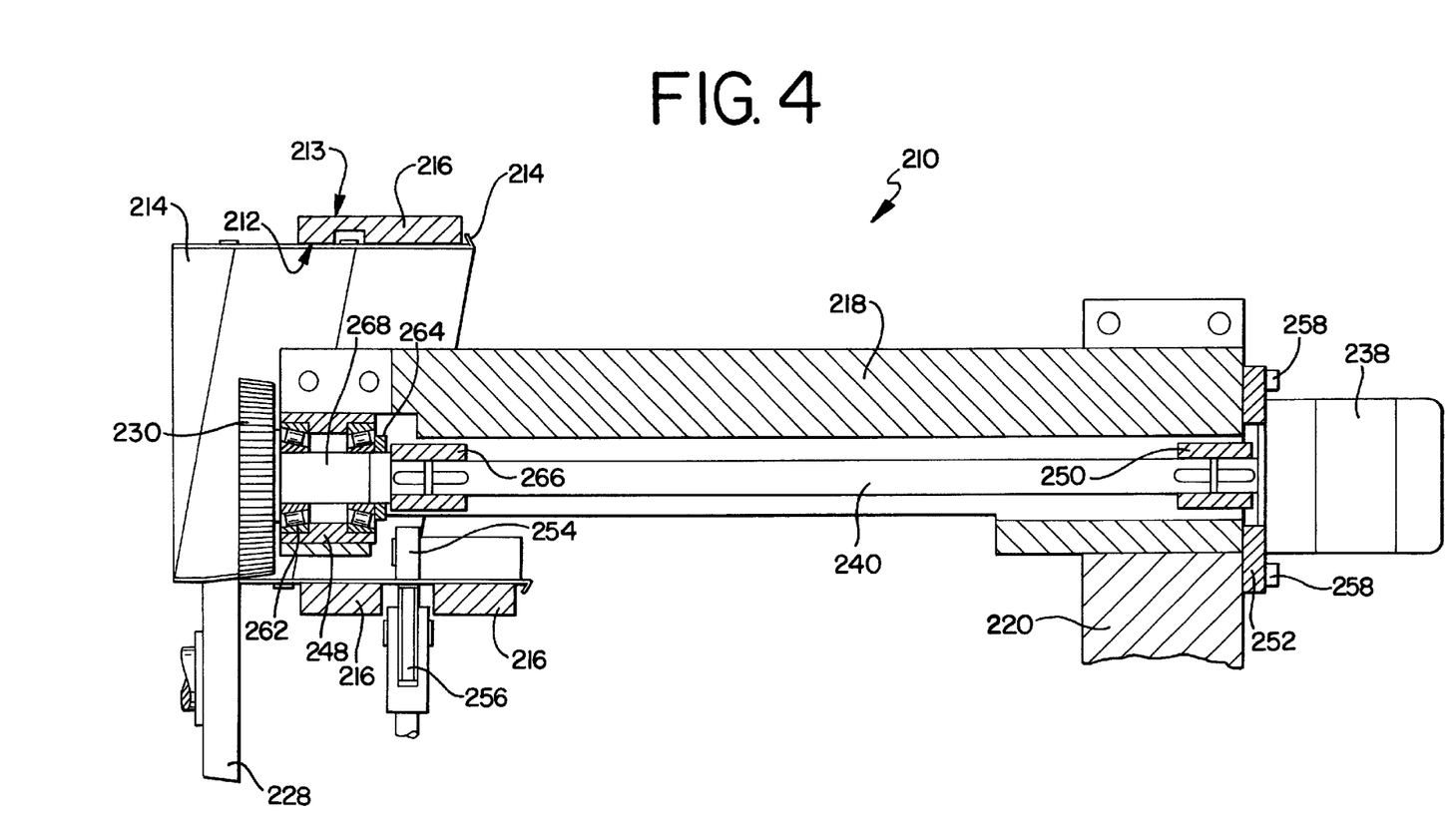
FIG. 4 is a cross-sectional side view focusing on the driving mechanism of a pipe cutting and forming apparatus according to a second presently preferred embodiment.

Referring now to FIG. 4, shown is an apparatus 210, according to a second presently preferred embodiment, for cutting and forming spiral pipe or tube. As above, the apparatus 210 includes a fixed forming head 216 that receives a thin strip of material, preferably sheet metal, and curls the strip of material around the interior of the forming head 216 to form a spiral pipe or tube 214. The forming head 216 has an inner circumference 212 and an outer circumference 213. The apparatus 210 operates similarly to the apparatus 110, and FIG. 4 focuses on a driving mechanism for the apparatus 210 which differs from the driving mechanism of the apparatus 110. Those skilled in the art will recognize that the description presented above will suffice for understanding the parts and elements not illustrated in FIG. 4. Rather than repeating this description, the focus of the description of apparatus 210 will be on the interaction of the driving mechanism with an inner knife 230.

In FIG. 4, the driving mechanism that includes a motor 238 and a drive shaft 240 is utilized to impart rotation to the inner knife 230 during a cutting operation. A hydraulic motor is illustrated in FIG. 4 for the motor 238. However, the motor 238 can also be a pneumatic motor. Other actuating devices, such as stepper motors, may also be used. In another aspect of the embodiment, an electric gear motor is utilized as the motor 238 to actively drive the inner knife 230. A mandrel or boom 218 acts as a supporting arm for the inner knife 230. The motor 238 is fixably connected to a mandrel or boom mounting block or holder 220 by way of a motor mounting plate or adapter 252 that is mounted on the mandrel holder 220 by a plurality of allen bolts 258. The drive shaft 240 spans the axial distance between the motor 238 and the inner knife 230 and proceeds along and within the mandrel 218. The drive shaft 240 is coupled to the motor 238 and the motor adapter 252 via a first coupling 250, and turns as actuated by the motor 238. A bearing housing 248 is attached to and enclosed within the mandrel 218 at the side of the mandrel 218 nearest the inner knife 230. The drive shaft 240 extends from the first coupling 250 and the motor 238 to a second coupling 266 where the drive shaft is secured to an inner knife bearing member 268 by a bearing lock nut 264. The inner knife bearing member 268 passes through the bearing housing 248 to connect with the inner knife 230. Preferably, the inner knife 230 has a knurled surface along the circumference of the inner knife 230 so that the inner knife 330 can grip and provide traction to incoming pipe material. A set of taper bearings including taper bearing 262 provide stability and facilitate movement of the inner knife bearing member 268 within the bearing housing 248. Alternatively, the inner knife bearing member 268 can be thought of as an extension of the drive shaft 240. The inner knife bearing member 268, whether integrated with the drive shaft 240 or connected to the drive shaft via the bearing lock nut 264, turns with the drive shaft 240. Accordingly, the inner knife 230 rotates with and at the same pace as the drive shaft 240.

Generally, the speed of rotation of the inner knife 230 or the surface speed of the inner knife 230 will be the same or a somewhat faster than the surface speed of the pipe 214 or pipe material. If the speed of the inner knife 230 is slower than the speed of the incoming pipe 214, then the inner knife 230 will obstruct the pipe 214 from moving, proving counterproductive to the purpose of actively driving the inner knife 230.

The inner knife 230 of FIG. 4 of the pipe cutting and forming apparatus 210 is generally positioned inside the pipe or tube 214. An outer knife 228 is brought into overlapping contact with the inner knife 230 during a cutting operation, as in the case of the apparatus 210 of FIGS. 1 and 2. The inner knife 230 is connected to, or integrated with the drive shaft 240 as explained above. When the motor 238 turns the drive shaft 240, the inner knife bearing member 268 moves with the drive shaft 240. In this way, the inner knife 230, is actively rotated by the driving mechanism of apparatus 210 of FIG. 4.

The pertinent aspects of the operation of the second presently preferred embodiment of the spiral pipe forming and cutting apparatus 210, shown in FIG. 4, are summarized below. The pipe former passes a strip of material, preferably metal, between the mandrel 218 and the forming head 216, and into the inner circumference 212 of the forming head 216, in a helical manner so that the adjacent edges of the coiled strip overlap. Inner and outer clinching rollers 254, 256 cooperate to fold the adjacent edges of the coiled strip and compress the folded edges into a helical lockseam in a known manner. During the pipe forming process, the pipe 214 moves axially as it rotates.

After a desired overall pipe length is reached, a cutting operation is performed. Preferably, the driving mechanism that includes the motor 238 and the drive shaft 240 actively rotates the inner knife 230 to facilitate the cutting operation. The cylinder assembly (not shown in FIG. 4) associated with the outer knife 228 activates to move the outer knife 228 into an overlapping position with the inner knife 230 to cut the pipe 214 in a similar manner to that described above. As the apparatus 110 continues to produce pipe, the pipe moves axially with, and rotates between, the overlapping inner and outer knives 130, 128. The pipe is preferably completely severed after one revolution. The pipe cutter and former 210 may be configured to automatically cut and form pipe having a desired overall length.

Figure 5:
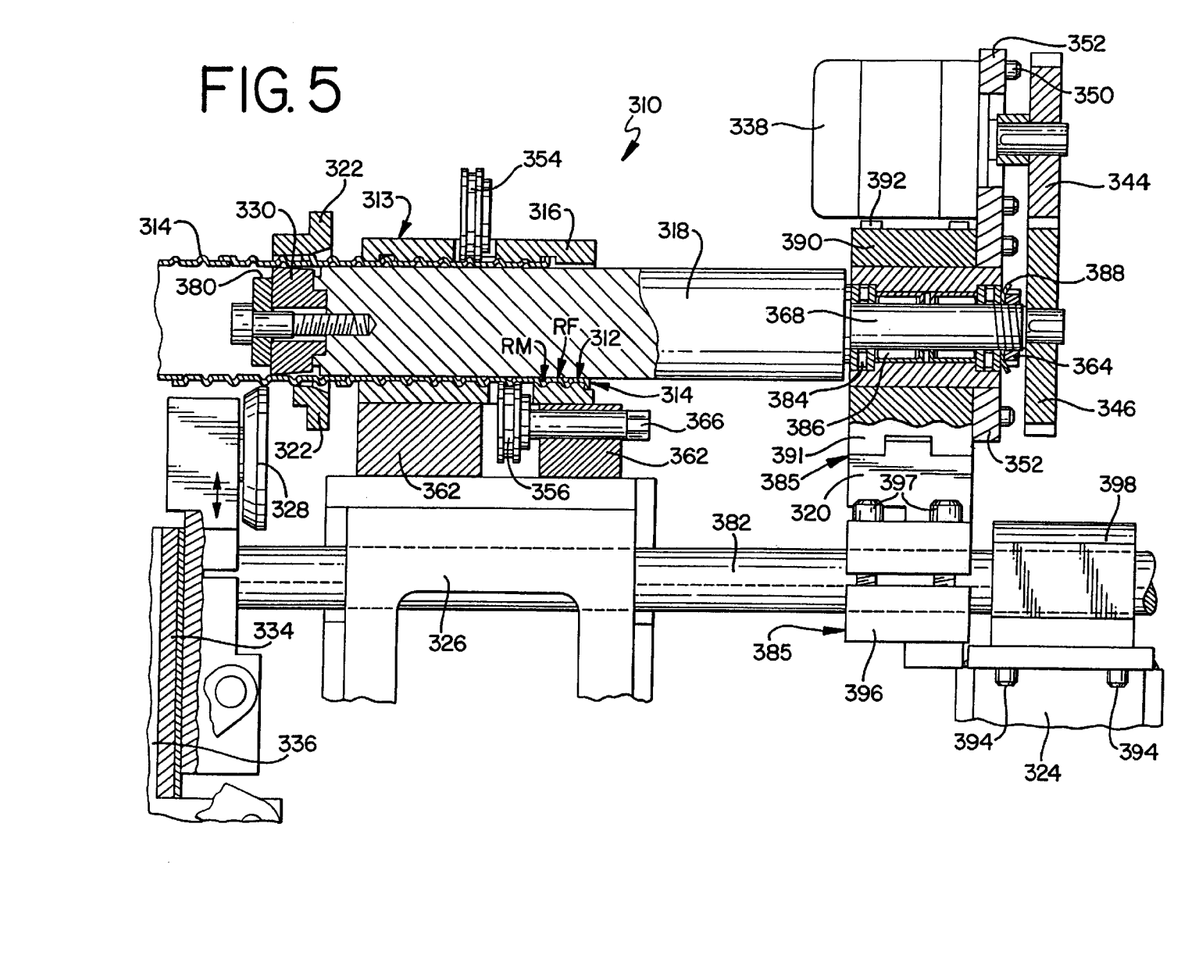
FIG. 5 is a cross-sectional side view focusing on the driving mechanism of a pipe cutting and forming apparatus according to a third presently preferred embodiment.

Referring now to FIG. 5, shown is an apparatus 310, according to a third presently preferred embodiment, for cutting and forming spiral pipe or tube. As above, the apparatus 310 includes a fixed forming head 316 that receives a thin strip of material, preferably sheet metal, and curls the strip of material around the interior of the forming head 316 to form a spiral pipe or tube 314. The forming head 316 has an inner circumference 312 and an outer circumference 313.

In FIG. 5, the driving mechanism is utilized to impart rotation to the inner knife 330 during a cutting operation. The driving mechanism includes a motor 338, a motor gear 344, a boom gear 346, and a supporting arm or boom 318. The boom 318 acts as a supporting arm for the inner knife 330. A hydraulic motor is illustrated in FIG. 5 for the motor 338. However, the motor 338 can also be a pneumatic motor. Other actuating devices, such as stepper motors, may also be used. In another aspect of the embodiment, an electric gear motor is utilized as the motor 338 to actively drive the inner knife 330. The motor 338 is fixably connected to a boom holder assembly 385 by way of a motor mounting plate or adapter 352. The adapter 352 is mounted on the boom holder assembly 385 and the motor 338 by a plurality of allen bolts 350. The motor 338 is integrated with or connected to the motor gear 344 at the motor mounting plate 352. The motor gear 344 turns as actuated by the motor 338. The motor gear 344 and the boom gear 346 are intermeshed together, so that as the motor gear 344 turns, the boom gear 346 turns as well. Preferably, the gears 344, 346 are sized such that the boom 318 rotates at approximately one-half of the pace of the motor 338. Of course, it should be understood that the boom 318 could be set to rotate at any speed relative to the motor 338.

Generally, the speed of rotation of the inner knife 330 or the surface speed of the inner knife 330 will be the same or a somewhat faster than the surface speed of the pipe 314 or pipe material. If the speed of the inner knife 330 is slower than the speed of the incoming pipe 314, then the inner knife 330 will obstruct the pipe 314 from moving, proving counterproductive to the purpose of actively driving the inner knife 330.

The boom gear 346 is integrated with a boom bearing member 368. The member 368 integrates with the boom 318. Accordingly, the boom 318 turns with the boom gear 346. In this way, the boom 318 stabilizes the inner knife 330 and keeps the inner knife 330 in place. The boom bearing member 368 passes through the boom holder assembly 385 that acts as a bearing housing. The boom bearing member 368 is surrounded by a combination of needle bearings 386 and needle thrust bearings 384. These needle and needle thrust bearings 386, 384 can be obtained from IKO Bearings, of Arlington Heights, Ill. The bearings 386, 384 are held in the boom holder assembly 385 by an annular support member 387, a lock washer 388, and a lock nut 364.

The boom holder assembly 385 has an upper section 390 and a lower section 391. Each section has a central semi-cylindrical cavity that abuts the annular support member 387. The upper section 390 and the lower section 391 are clamped to each other by a plurality of allen bolts 392. The lower section 391 is mounted on an attachment block 320, and fixed thereto by allen bolts (not shown). The attachment block 320 passes between a pair of guide shafts 382, and is secured to a shaft connector 396 by allen bolts (not shown). A plurality of allen bolts 397 squeezed together the ends of the shaft connector 396 around the guide shafts 382, so that the shaft connector 396 slides axially with the guide shafts 382. The guide shafts 382 pass through openings in a forming head table 326, and slide through four pair of bearing housings 398, which include THK Slide Bearing SC 25 assemblies. There are four such bearing housings 398, each of which is attached to the top of a mounting leg 324 by allen bolts 394. The four mounting legs 324 are provided to support the boom holder assembly 385 and the boom 318 at the correct height with respect to the forming head table 326 and the spirally formed pipe 314. The mounting legs 324 are attached to the base (not shown) of the apparatus 310.

An outer knife 328 is generally positioned below the inner knife 330 and outside of the pipe 314. The outer knife 328 is held in a vertical holder 332 by a lock washer and lock nut (not shown) that are connected to the shaft of the outer knife 328. Bearings (not shown) permit the outer knife 328 to be passively rotatable, that is, rotatable by contact with the rotating pipe 314. The vertical holder 332 is attached to a slide bearing assembly 334. The slide bearing assembly 334 is also attached to the central portion of a knife slide block 336. The vertical holder 332 and outer knife 328 can thus slide up and down relative to the knife slide block 336. The knife slide block 336 has two cylinder openings through which the guide shafts 382 pass. A plurality of allen bolts (not shown) squeeze together the sides of these openings around the shafts 382, so that the knife slide block 336 is also affixed to and slides axially with the guide shafts 382.

As shown in FIG. 5, the boom 318 spans the axial distance between the boom holder assembly 385 and the forming head 316. At one end of the boom 318, the inner knife 330 is attached to the boom 318 with a bolt 381. A washer 380 is positioned between the bolt 381 and the inner knife 330.

Preferably, the radius $R_M$ of the boom 318 is somewhat less than the radius $R_F$ corresponding to the inner circumference 312 of the forming head 316, so that the pipe 314 can be formed and the rotating boom 318 supported. In this way, the forming head 316 serves an additional function as a support for the cylindrical boom 318.

The inner knife 330 of FIG. 5 of the pipe cutting and forming apparatus 310 is generally positioned inside the pipe or tube 314. The outer knife 328 is brought into overlapping contact with the inner knife 330 during a cutting operation, as in the case of the apparatus 310 of FIGS. 1 and 2. The inner knife 330 is connected to, or integrated with the boom 318 as explained above.

Preferably, the inner knife 330 has a knurled surface along the circumference of the inner knife 330 so that the inner knife 330 can grip and provide traction to incoming pipe material.

When the motor 338 turns the motor gear 344, the boom gear 346 turns with the motor gear 344. As the boom gear 346 rotates, the boom bearing member 368, the boom 318, and the inner knife 330 secured to the boom 318 with the knife washer 380 will rotate together. In this way, the inner knife 330 is actively rotated by the driving mechanism of apparatus 310 of FIG. 5.

The pertinent aspects of the operation of the third presently preferred embodiment of the spiral pipe forming and cutting apparatus 310, shown in FIG. 5, are summarized below.

The pipe former passes a strip of material, preferably metal, between the rotatable boom 318 and the forming head 316, and into the inner circumference 312 of the forming head 316, in a helical manner so that the adjacent edges of the coiled strip overlap. A pair of upper and lower clinching rollers 354, 356 external to the forming head 316 cooperate to fold the adjacent edges of the coiled strip and compress the folded edges into a helical lockseam in a known manner. During the pipe forming process, the pipe 314 moves axially as it rotates.

After a desired overall pipe length is reached, a cutting operation is performed. Preferably, the driving mechanism that includes the motor 338, the motor gear 344, the boom gear 346, and the rotatable supporting arm or boom 318, actively rotates the inner knife 330 to facilitate the cutting operation. The cylinder assembly (not shown in FIG. 5) associated with the outer knife 328 activates to move the outer knife 328 into an overlapping position with the inner knife 330 to cut the pipe 314 in a similar manner to that described above. As the apparatus 110 continues to produce pipe, the pipe moves axially with, and rotates between, the overlapping inner and outer knives 130, 128. The pipe is preferably completely severed after one revolution. The pipe cutter and former 310 may be configured to automatically cut and form pipe having a desired overall length.

The apparatus 310 also includes a pipe support structure 322 that has a cylindrical cavity having generous space to receive the spiral pipe 314 as shown in FIG. 5. The pipe support structure 322 at least partially surrounds the spiral pipe 314, including the top and the bottom sides of the spiral pipe 314 and the inner knife 330. The pipe support structure 322 operates to prevent the boom 318 from excessive deflections in the upward or downward directions relative to the spiral pipe 314. Such a deflection could occur in response to the upward force exerted by the outer knife 328 during a cutting operation, for example. The structure 322 accordingly serves to limit the amount of play in the spiral pipe 314. The structure 322 is coupled to the guide shafts 382 in an arrangement (not shown) that allows the structure 322 to move with the guide shafts 382 and thus the knives 330, 328. The apparatus 310 is not limited to this arrangement. For example, in a variation of the apparatus 310, the support structure 322 does not move with the shafts 382 or the knives 330, 328, but rather the structure 322 is connected to the forming head table 326 that supports the forming head 316. In this variation, the structure 322 preferably spans at least the distance traveled by the knives 330, 328 during a cutting operation so that a deflection of the spiral pipe 314 is prevented.

The forming head table 326 supports the forming head 316 with an intervening forming head base component 362. The base component 362 supports the forming head 316 at each lateral end. The base component 362 also houses a lower clinching roller shaft 366 at one lateral end of the forming head 316, as shown in FIG. 5. Preferably, the shaft 366 is stationary during the operation of the apparatus 310. The lower clinching roller 356 is mounted eccentrically on the shaft 366 so that the position of the roller 356 is adjustable.

Figure 6:
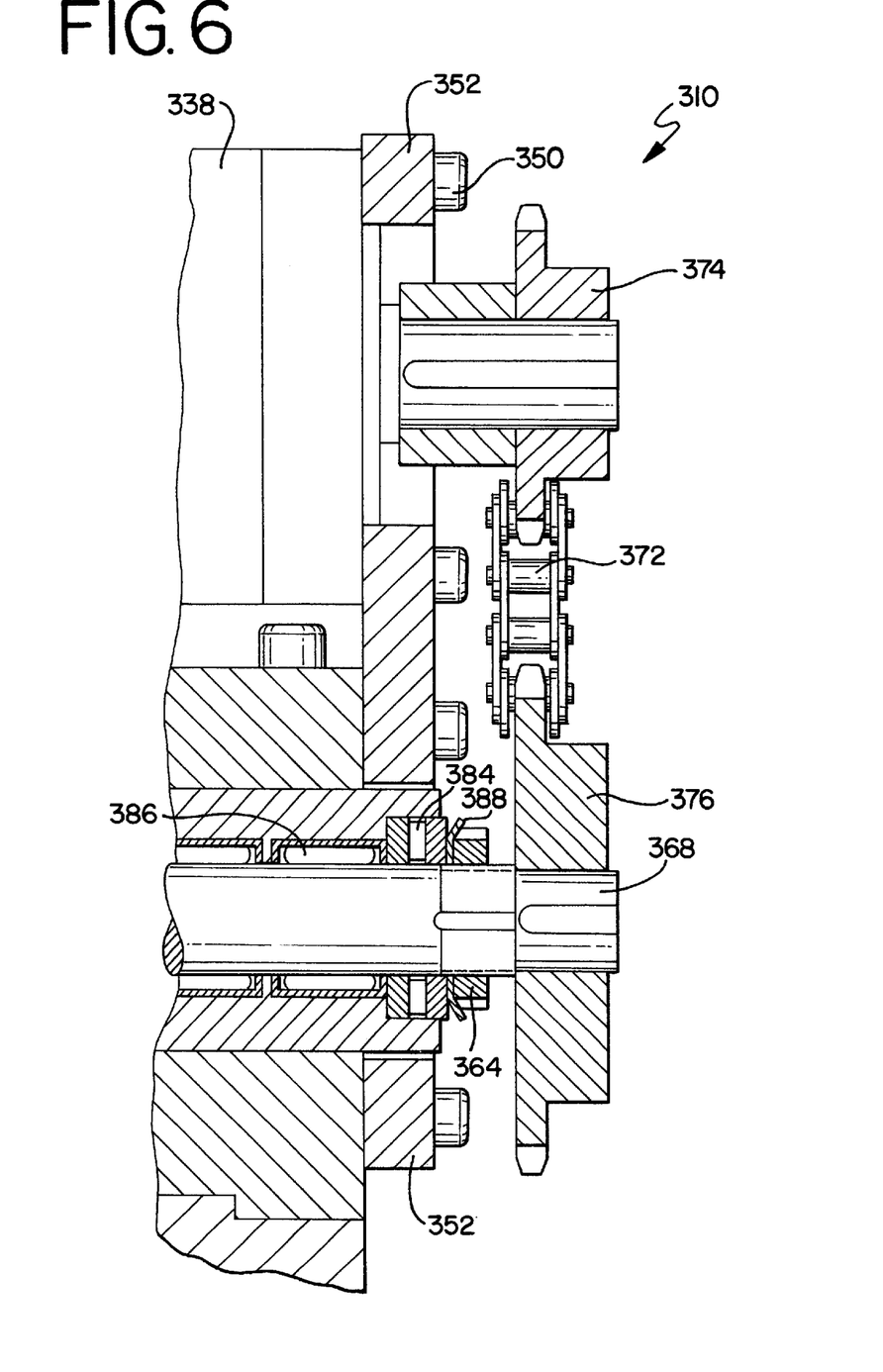
FIG. 6 is a cross-sectional side view focusing on a portion of an alternate active driving mechanism according to the third presently preferred embodiment.

FIG. 6 shows a cross sectional side view of a portion of an alternate active driving mechanism for the inner knife 330 of the spiral pipe forming and cutting apparatus 310. It will be understood by those skilled in the art that the motor gear 344 and the boom gear 346 of FIG. 5 can be replaced with a drive chain 372, and a pair of sprockets: a boom sprocket 376 and a motor sprocket 374. The motor sprocket 374 is connected to or integrated with the motor 338 and turns with the motor 338. The boom sprocket 376 is mounted with the boom 318 via the boom bearing member 368. The drive chain 372 is looped around the sprockets 274, 376.

When the motor 338 turns the motor sprocket 374, the boom sprocket 376 turns with the motor sprocket 374 via the drive chain 372. As the boom sprocket 376 rotates, the boom bearing member 368, the boom 318, and the inner knife 330 secured to the boom 318 with the knife washer 380 will rotate together. In this way, the inner knife 330 is actively rotated by the alternate driving mechanism of apparatus 310 shown partially in FIG. 6.

A variety of presently preferred and exemplary embodiments are presented, each including a driving mechanism to actively rotate the inner knife. In a first presently preferred embodiment, a motor actively rotates the inner knife via a drive shaft and a drive chain (and two sprockets). The motor and the drive shaft are axially offset from the inner knife. A pair of intermeshing gears can replace the drive chain and the pair of sprockets. In a second presently preferred embodiment, a motor actively rotates the inner knife via a drive shaft. The motor and the drive shaft are along the axis of the inner knife and no drive chain is required. In a third presently preferred embodiment, a motor actively rotates the inner knife via a pair of intermeshing gears and a revolving supporting arm such as a boom. The motor is axially offset from the inner knife while the supporting arm is along the axis of the inner knife. A drive chain and a pair of sprockets can replace the pair of intermeshing gears. Of course, other embodiments and arrangements are possible, other than these illustrative examples.

In pipe cutters having passively rotatable or fixed cutting arrangements, material may encounter resistance when processed. The helical lockseam in particular may create difficulties for fixed or passively rotatable knives. In the case of a thin gauge or a light material, the material can buckle when it encounters the fixed or passively rotatable knife. A thick gauge or a heavy material will in general create a thicker lockseam. For example, the lockseam may consist of two adjacent sides of pipe folded over on themselves and together with each other, for a thickness of four times the thickness of a single layer. The lockseam might cause the machine to stall when it encounters the knife. The preferred embodiment described herein assists with the cut to decrease the likelihood of common pipe formation mishaps such as buckling of light material and as stalling of the machine during the processing of heavy material.

More generally, an advantage of the presently preferred method and apparatus and accompanying embodiments is that an actively rotatable inner knife is provided to assist the cutting operation to reduce the likelihood of the operation causing material to buckle or the apparatus to stall.

An additional advantage of an actively driven inner knife is in its relative simplicity compared with an actively driven outer knife in a typical implementation. In a pipe cutter that moves the outer knife into the pipe, an actively driven outer knife may require added gears, joints, or flexible shafts to bring the force of a motor to this knife. Alternatively, all or part of the entire driving mechanism may have to be moved with the outer knife as the knife moves, for example, up and down. The embodiments disclosed herein describe less complicated driving mechanisms that are capable of imparting rotation to the inner knife than those generally available with a moving and actively rotatable outer knife.

As used herein, the term motor is used broadly to refer to any variety of driving or actuating mechanisms. Preferably, the motor is a hydraulic motor. However, the embodiments are not limited to a hydraulic motor, and other motors or similar devices can be used, such as a pneumatic motor or a stepper motor. For example, a hydraulic motor is illustrated in FIG. 1 for the motor 138. However, the motor 138 can also be a pneumatic motor. Other actuating devices, such as stepper motors, may also be used. An electric gear motor can also be utilized in the embodiments to actively drive the inner knife.

As used herein, the term supporting arm is used broadly to refer to a support arm upon which a tool, such as an inner knife, is mounted. Preferably, the supporting arm is a cylindrical element such as a boom or a mandrel. In some embodiments, the supporting arm is a fixed element that does not rotate, while in other embodiments the supporting arm turns or rotates responsively to a driving mechanism. In rotating embodiments of the supporting arm, the arm may be considered part of the driving mechanism or may be thought of as external to the driving mechanism. In fixed embodiments of the supporting arm, the driving mechanism as well as the inner knife may be mounted to the supporting arm. The inner knife may rotate independently of, or in conjunction with, the supporting arm, depending on the particular embodiment or embodiments.

As used herein, the term knife is intended broadly to refer to a wide variety of instruments that can be used for cutting. In general, actively rotated or driven knives will be knurled on the outside circumferential surface to give traction to the material that is presented to the knife.

It should be understood that, in general, the speed of rotation of the knife or the surface speed of the knife will be the same or a somewhat faster than the surface speed of the pipe or pipe material. If the speed of the knife is slower than the speed of the incoming pipe, then the knife will obstruct the pipe from moving, proving counterproductive to the purpose of actively driving the inner knife.

Generally a first system that consists of a first sprocket (mounted on a first rotating rod) that rotates a second sprocket (mounted on a second rotatable rod) via a drive chain is mechanically analogous to a second system that consists of a first gear (mounted on a first rotating rod) that meshes and rotates with a second gear (mounted on a second rotatable rod). It will be understood to those of skill in the art that the first system can replace the second system and the second system can replace the first system in many instances. As used herein, a drive chain looped around two sprockets can replace, or can be replaced by, two intermeshing gears to accomplish actively drive an inner knife in a spiral pipe cutter and former.

In all of the presently preferred embodiments disclosed herein, a spiral pipe or tube forming head is utilized, as well as an inner knife and an outer knife. The knives are referred to in this way (inner and outer) because of their positioning relative to the spiral pipe that is formed and to the pipe forming head. The pipe forming head has an inner circumference and an outer circumference. Preferably, the inner knife is positioned substantially inside the inner circumference of the pipe forming head. Preferably, the outer knife is positioned substantially inside the outer circumference of the pipe forming head.

It should be understood that the term driving mechanism is intended to refer broadly to actuating devices such as motors. The driving mechanism can include a series of drive elements, such as a motor, a drive shaft, a drive chain, a pair of intermeshing gears, and any intervening or interconnecting parts. A driving mechanism is not limited to this arrangement, however. The driving mechanism could also refer to the motor only, or to a motor and a drive shaft alone, for example. Most broadly, any element or group of elements that causes active rotation of the inner knife is understood to either encompass the driving mechanism, embody the driving mechanism, be a part of or belong to the driving mechanism, or work in cooperation with the driving mechanism.

In a presently preferred embodiment, the inner knife actively rotates in response to a driving mechanism at all times during operation of the apparatus. Of course, in other presently preferred embodiments, the driving mechanism of the presently preferred embodiments and method is selectively operable so that the inner knife will not actively rotate at all times. Besides uninterrupted operation when the apparatus is forming or cutting spiral pipe, other time lengths and usage criteria for the rotation of the inner knife are possible. The inner knife might be rotated for the duration of a spiral pipe cutting operation, for example.

As used herein, spiral pipe is intended broadly to refer to any pipe that can be formed or cut in spiral pipe forming or cutting apparatuses, such as the presently preferred embodiments described herein. For example, in FIG. 5, corrugated spirally formed pipe is illustrated. However, the embodiments described herein are not limited to corrugated pipe and non-corrugated pipe can be utilized in spiral pipe forming or cutting apparatuses as well.

From the foregoing, a spiral pipe cutting and forming apparatus having an actively driven inner knife has been described. The apparatus assists the cutting operation to reduce the likelihood of the operation causing material to buckle or the apparatus to stall.

It is intended that the foregoing detailed description be regarded as illustrative rather than limiting, and that it be understood that the following claims, including all equivalents, are intended to define the scope of this invention.

I claim:

1. A pipe cutting apparatus for cutting spirally formed pipe, the pipe cutting apparatus comprising:
   a forming head for receiving a strip of material and coiling the material into a spiral pipe, said forming head having an inner and outer circumference;
   a first knife positioned substantially inside the inner circumference of said forming head;
   a driving mechanism attached to said first knife, said driving mechanism comprising:
   a motor; and
   a drive element coupled to said motor, wherein said drive element is capable of imparting rotation to said first knife responsively to said motor; and
   a second knife positioned substantially outside the outer circumference of said forming head, wherein said second knife is configured for movement into overlapping contact with said first knife to cut the spiral pipe.

2. The pipe cutting apparatus of claim 1, wherein said drive element comprises a drive chain.

3. The pipe cutting apparatus of claim 1, wherein said drive element comprises a first gear and a second gear intermeshed together.

4. The pipe cutting apparatus of claim 1, wherein said drive element comprises a drive shaft.

5. The pipe cutting apparatus of claim 4, wherein said driving mechanism further comprises a drive chain associated with said drive shaft to impart rotation to said first knife.

6. The pipe cutting apparatus of claim 4, wherein said driving mechanism further comprises a first gear and a second gear intermeshed together, wherein said second gear is associated with said drive shaft to impart rotation to said first knife.

7. The pipe cutting apparatus of claim 1, wherein said drive element comprises a supporting arm.

8. The pipe cutting apparatus of claim 7, wherein said driving mechanism further comprises a drive chain associated with said supporting arm to impart rotation to said first knife.

9. The pipe cutting apparatus of claim 7, wherein said driving mechanism further comprises a first gear and a second gear intermeshed together, wherein said second gear is associated with said supporting arm to impart rotation to said first knife.

10. The pipe cutting apparatus of claim 1, wherein said driving mechanism is selectively operable.

11. A pipe cutting apparatus for cutting spirally formed pipe, the pipe cutting apparatus comprising:
a forming head for receiving a strip of material and coiling the material into a spiral pipe, said forming head having an inner and outer circumference;
a supporting arm;
a first knife positioned substantially inside the inner circumference of said forming head and mounted on said supporting arm, wherein said first knife lies along an axis defined by said supporting arm;
a selectively operable driving mechanism attached to said first knife, said driving mechanism comprising:
a motor;
a drive shaft coupled to said motor, wherein said drive shaft and said motor are offset from the axis defined by said supporting arm; and
a drive chain coupled to said drive shaft and said first knife, wherein said drive chain is capable of imparting rotation to said first knife responsively to said motor and said drive shaft; and
a second knife positioned substantially outside the outer circumference of said forming head, wherein said second knife is configured for movement into overlapping contact with said first knife to cut the spiral pipe.

12. The pipe cutting apparatus of claim 11, wherein said driving mechanism is selectively operable.

13. A pipe cutting apparatus for cutting spirally formed pipe, the pipe cutting apparatus comprising:
a forming head for receiving a strip of material and coiling the material into a spiral pipe, said forming head having an inner and outer circumference;
a supporting arm;
a first knife positioned substantially inside the inner circumference of said forming head and mounted on said supporting arm, wherein said first knife lies along an axis defined by said supporting arm;
a driving mechanism attached to said first knife, said driving mechanism comprising:
a motor;
a drive shaft coupled to said motor, wherein said drive shaft and said motor are offset from the axis defined by said supporting arm;
a first gear coupled to said drive shaft; and
a second gear intermeshing with said first gear, wherein said second gear is coupled to said first knife, wherein said first and said second gears together are capable of imparting rotation to said first knife responsively to said motor and said drive shaft; and
a second knife positioned substantially outside the outer circumference of said forming head, wherein said second knife is configured for movement into overlapping contact with said first knife to cut the spiral pipe.

14. The pipe cutting apparatus of claim 13, wherein said driving mechanism is selectively operable.

15. A pipe cutting apparatus for cutting spirally formed pipe, the pipe cutting apparatus comprising:
a forming head for receiving a strip of material and coiling the material into a spiral pipe, said forming head having an inner and outer circumference;
a supporting arm;
a first knife positioned substantially inside the inner circumference of said forming head and mounted on said supporting arm, wherein said first knife is rotatably mounted along an axis defined by said supporting arm;
a driving mechanism attached to said first knife, said driving mechanism comprising:
a motor, wherein said motor is coupled to said supporting arm; and
a drive shaft coupled to said motor, wherein said drive shaft is capable of imparting rotation to said first knife responsively to said motor and wherein said drive shaft and said motor lie along the axis defined by said supporting arm; and
a second knife positioned substantially outside the outer circumference of said forming head, wherein said second knife is configured for movement into overlapping contact with said first knife to cut the spiral pipe.

16. The pipe cutting apparatus of claim 15, wherein said driving mechanism is selectively operable.

17. A pipe cutting apparatus for cutting spirally formed pipe, the pipe cutting apparatus comprising:
a forming head for receiving a strip of material and coiling the material into a spiral pipe, said forming head having an inner and outer circumference;
a first knife positioned substantially inside the inner circumference of said forming head;
a selectively operable driving mechanism attached to said first knife, said driving mechanism comprising:
a supporting arm to support said first knife;
a motor, wherein said motor is offset from an axis defined by said supporting arm; and
a first gear coupled to said motor; and
a second gear intermeshing with said first gear, wherein said second gear is coupled to said supporting arm, wherein said first and said second gears together are capable of imparting rotation to said first knife responsively to said motor by turning said supporting arm; and
a second knife positioned substantially outside the outer circumference of said forming head, wherein said second knife is configured for movement into overlapping contact with said first knife to cut the spiral pipe.

18. The pipe cutting apparatus of claim 17, wherein said driving mechanism is selectively operable.

19. A pipe cutting apparatus for cutting spirally formed pipe, the pipe cutting apparatus comprising:
a forming head for receiving a strip of material and coiling the material into a spiral pipe, said forming head having an inner and outer circumference;
a first knife positioned substantially inside the inner circumference of said forming head;
a selectively operable driving mechanism attached to said first knife, said driving mechanism comprising:
a supporting arm to support said first knife;
a motor, wherein said motor is offset from an axis defined by said supporting arm; and a drive chain coupled to said motor and said supporting arm, wherein said drive chain is capable of imparting rotation to said first knife responsively to said motor by turning said supporting arm; and a second knife positioned substantially outside the outer circumference of said forming head, wherein said second knife is configured for movement into overlapping contact with said first knife to cut the spiral pipe.

20. The pipe cutting apparatus of claim 19, wherein said driving mechanism is selectively operable.

21. A method of cutting spirally formed pipe, the method comprising:

receiving a strip of material at a forming head of a spiral pipe former, the forming head having an inner and an outer circumference;

forming a spiral pipe in the spiral pipe former;

engaging a driving mechanism attached to a first knife positioned substantially inside the inner circumference of the forming head to impart rotation to the first knife; and cutting the spiral pipe with the first knife by bringing a second knife positioned substantially outside the outer circumference of the forming head into overlapping contact with the first knife.

22. The pipe cutting method of claim 21, wherein the driving mechanism comprises a motor.

23. The pipe cutting apparatus of claim 22, wherein the driving mechanism is selectively operable.

* * * * *